United States Patent [19]

Klimek et al.

[11] 3,844,505

[45] Oct. 29, 1974

[54] SPOOL MOUNT FOR MAGNETIC TAPE RECORDING AND/OR PLAYBACK MACHINES

[75] Inventors: Norbert Max Klimek; Manfred Anton Huber, both of London, England

[73] Assignee: English Numbering Machines Limited, London, England

[22] Filed: July 3, 1972

[21] Appl. No.: 268,856

[30] Foreign Application Priority Data

Sept. 29, 1971 Great Britain .................... 45290/71

[52] U.S. Cl. .................................. 242/206, 274/4 D

[51] Int. Cl. ......................... B11b 15/32, G03b 1/04

[58] Field of Search ............................ 242/182–186, 242/200–206; 274/4 CD, 11 D

[56] References Cited

UNITED STATES PATENTS

| | | | |
|---|---|---|---|
| 2,049,944 | 8/1936 | Carpenter | 242/201 |
| 3,606,198 | 9/1971 | Gilbreath et al. | 242/204 |

*Primary Examiner*—Leonard D. Christian

*Attorney, Agent, or Firm*—Brisebois & Kruger

[57] ABSTRACT

A driving device, particularly for a tape spool, in which a constantly rotating drive member can be selectively coupled to a shaft by a solenoid for driving the shaft in one direction. When not so driven, the shaft is able to rotate in the opposite direction but is lightly braked by the drive member.

16 Claims, 1 Drawing Figure

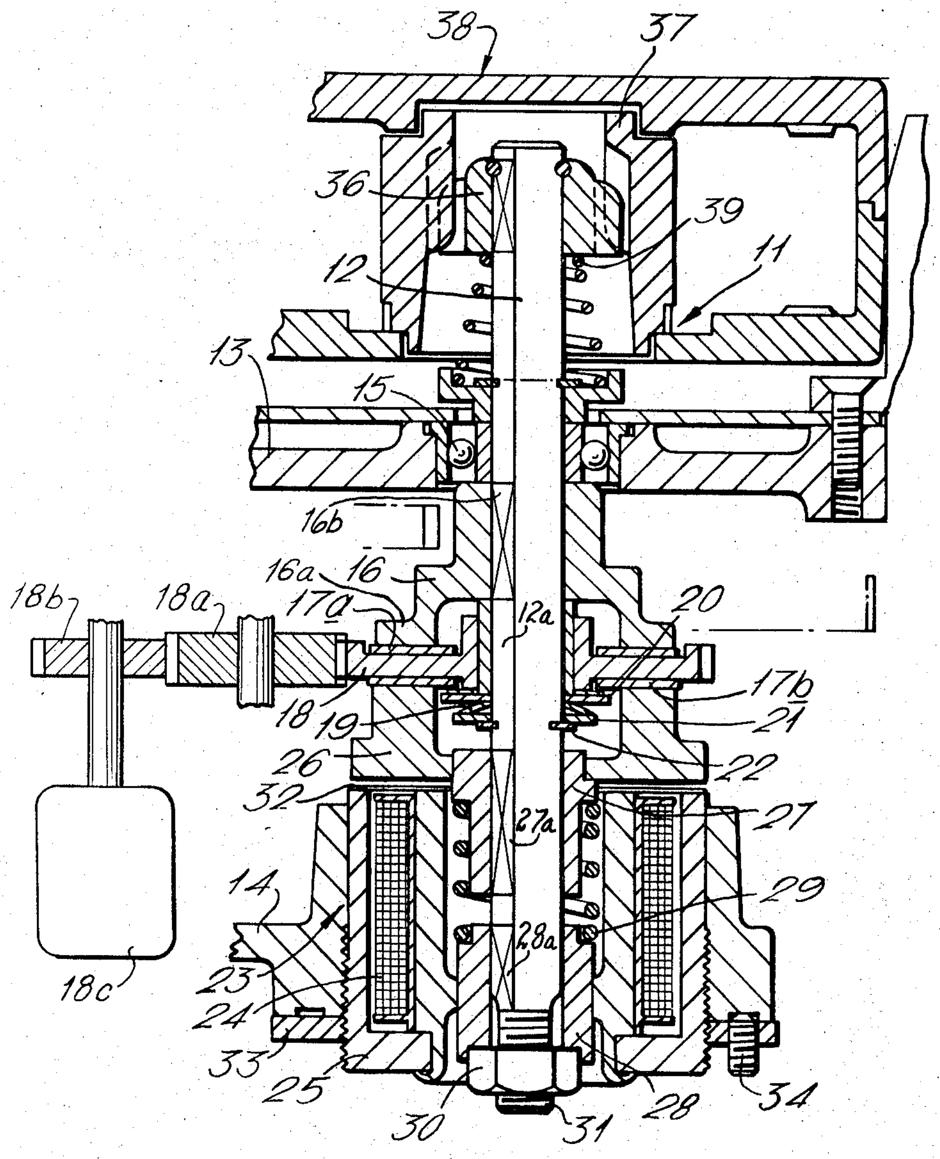
38
37
36
39
12
11
13
15
16b
16a
16
17a
20
12a
18b
18a
17b
18
19
21
26
22
32
27a
27
14
29
23
28a
24
33
25
34
30
31
28
18c

SPOOL MOUNT FOR MAGNETIC TAPE RECORDING AND/OR PLAYBACK MACHINES

The present invention relates to magnetic tape recording and/or playback machines, and particularly to an improved device for mounting a spool of magnetic tape and for transmitting drive thereto from a motor of the machine.

Embodiments of this invention find particular utility in a tape transport of the type described in our co-pending British Pat. application No. 44088/71. This suitability arises because embodiments of the present invention can be constructed so as to have various features, which will be described in greater detail below, which allow the drive from the motor to be transmitted in one direction, and which allow the spool to rotate in either direction with a light resistance which can be overcome if the tension in the tape is greater than the transmitted driving force.

Known spool mounting devices are frequently arranged to connect the spool directly to a motor which is to drive it, and are arranged to disengage from this motor when the tape is to be driven in the direction opposite the direction in which it is driven by the motor or alternatively to allow the motor to be rotated backwards with respect to its normal operating direction of rotation, to supply a light tension to the tape as it is unwound from the spool.

According to the present invention there is provided a spool mounting device for a tape transport, comprising a spindle adapted to receive a spool for rotation therewith, frictional drive transmitting means for transmitting drive in either rotational direction to the spindle, resilient biasing means for biasing the drive transmitting means into driving engagement with the spindle to drive the spindle to rotate in the same direction as the drive transmitting means, and means for disengaging the said drive transmitting means against the action of the said resilient biasing means to allow the spindle to rotate in either direction of rotation while the drive transmitting means continues to rotate in one direction of rotation.

It will be appreciated that being able to control the frictional engagement between the drive transmitting means and the spool allows a single motor to be used to drive both spools of a tape transport since the drive transmitting means may be frictionally engaged with one spool and disengaged from the other.

In a preferred embodiment of the invention the drive transmitting means has at least one part thereof slidably mounted on the spindle and axially movable to engage or disengage the drive to the spindle. Preferably the said one part of the drive transmitting means is freely rotatable with respect to the spindle and co-operates to transmit drive, with a second part of the drive transmitting means mounted on the spindle, the second part being rotatably and axially fixed with respect to the spindle.

In one embodiment of the present invention the said one part of the drive transmitting means comprises a gear wheel having a lining of frictional material on one face thereof for frictionally engaging the said second part of the drive transmitting means, and preferably the resilient biasing means comprises a compression spring surrounding the spindle for biasing the gear wheel into engagement with the said second part of the drive transmitting means.

The means for disengaging the drive transmitting means may be a mechanical linkage, but preferably this means for disengaging the drive transmitting means comprises a solenoid the armature of which is linked to the drive transmitting means. In an embodiment of this type it is preferred that the solenoid coil and the solenoid armature both surround at least part of the spindle. Similarly, it is preferred that the said compression spring is positioned to bias the armature of the solenoid into engagement with the gear wheel when the solenoid is de-energised. It will be appreciated that for the majority of the time that the tape transport is in use the drive transmitting means will be engaged, and accordingly it is better that the solenoid should be de-energised for the majority of the time and only energised for relatively short periods of time.

In a preferred embodiment of the present invention the solenoid armature is slidably mounted on the spindle for rotation therewith. In such an embodiment the armature of the solenoid then rotates at all times with the shaft so that when the drive transmitting means is operating to transmit the maximum drive there is no slip between the armature and the drive transmitting means. Correspondingly, when the drive transmitting means is moving faster than the spindle, which situation will obtain for the majority of the time that the drive transmitting means is actually transmitting drive to the spindle, the armature of the solenoid will rotate at the same speed as the co-operating part of the drive transmitting means which, itself, is preferably linked to the spindle so that the frictional forces exerted on either side of the gear wheel of the drive transmitting means are equalised.

In such an embodiment, of course, it is preferred that the gear wheel also has a lining of friction material on the side facing the solenoid armature.

Preferably there are provided means for adjusting the spring to adjust the biasing force on the solenoid armature, this has the effect of adjusting the maximum frictional force exerted by the slipping clutch of the drive spool mounting device, and also of adjusting the point at which the frictional force is released when the armature is retracted as the solenoid is energised. Similarly, it is preferred that there are provided means for adjusting the position of the solenoid coil to adjust the air gap between the coil core and the armature. Such an adjustment provides a further means for regulating the operation of the device so that the time at which the frictional force is disengaged to allow the spool to rotate in either direction despite the rotation of the drive transmitting means can be precisely determined.

Preferably there is provided a spacer of a material having a low remanence between the co-operating faces of the coil core and the armature so that the armature is readily released when the coil is de-energised. This, of course, increases the speed at which the device responds after an electrical signal has been received to de-energise the coil.

In a preferred embodiment the drive transmitting means is arranged to drive the said gear wheel in a constant direction of rotation at all times when the motor is in operation. Such an embodiment, for example, is particularly suitable for use in the device described in our co-pending British Pat. application No. 44088/71 in which the two tape spools, and two capstans are all driven from a single motor and arranged to rotate continuously in a given direction when the motor is in operation. Each tape spool rotates in a respective direction and the capstans rotate in opposite directions, and means are provided to engage one or other capstan with the tape to effect transport in one direction or the other. There are also required means for controlling the frictional force exerted by the drive transmitting means so that whichever spool mounting device is carrying the spool which, at any time, is the supply spool, can have its frictional force reduced so that the tension in the tape is maintained, but reduced to a low value.

One embodiment of the present invention will now be more particularly described, by way of example, with reference to the accompanying drawing in which the FIGURE is a cross sectional view of a spool mounting device constructed in accordance with the present invention.

Referring now to the drawing, the spool mounting device, generally indicated 11, comprises a spindle 12 mounted between two support frames 13 and 14. The spindle 12 carries a longitudinal groove in the form of a key-way, and is supported in the frame 13 by a ball-race 15. The end of the spindle 12 which projects above the frame 13 is provided with a spool mounting boss 36 which is shaped to receive a spool 37 of, for example, a tape cassette 38 and to transmit rotational drive thereto as the spindle 12 is rotated. The boss 36 is located by means of a conical spring 39 which allows a certain "floating" action of the boss 36 to accommodate variations in the position of the tape spool. This is convenient, for example, if the two tape spools are linked together in a cassette.

Immediately below the frame 13 the spindle carries a clutch hub 16 of the drive transmission device; the hub 16 is in the form of a collar having a radially directed flange 16*a* lying adjacent a gear wheel 18 carrying a lining 17*a* of frictional material on one face thereof, and a lining 17*b*, of similar frictional material, on the other face thereof. The hub 16 is formed with a radially inwardly directed key 16*b* which engages the keyway 12*a* of the spindle 12 so that it rotates with the spindle 12.

Adjacent the clutch hub 16 there is the gear wheel 18 which is freely rotatably mounted on the spindle 12 so that it can move axially as well as rotationally with respect to the spindle 12. The gear wheel 18 is connected to the drive motor 18*c* of the tape recording and/or playback machine by a gear train comprising the gear wheels 18*a* and 18*b* . The gear train 18*a*, 18*b* is permanently connected to the motor so that the gear wheel 18 rotates continuously at all times when the motor 18*c* of the machine is in operation. The gear wheel 18 is lightly axially biased towards the hub 16 by means of a spring washer 19 which is located between two plain washers 20 and 21 the latter of which is held against axial movement away from the gear wheel 18 by means of a circlip 22 on the spindle 12.

The drive transmission device further comprises a solenoid generally indicated 23 having a coil 24 within a core 25 which surrounds the spindle 12. The solenoid has a face armature 26 which lies between the coil 24 and the gear wheel 18. The armature 26 is mounted on a bush 27 which is keyed at 27*a* onto the shaft 12 in such a way that it can slide axially along the spindle 12, but is secured for rotation with the spindle 12. A second bush 28 is keyed at 28*a* onto the shaft 12 also but is normally stationary at one end thereof, and a compression spring 29 links the two bushes 27 and 28 so that the armature 26 is resiliently biased towards the gear wheel 18.

The bush 28 is held in position by means of a nut 30 on a screw threaded portion 31 at the end of the spindle 12 and the position of the bush 28 is adjustable along the shaft 12 by means of the nut 30 so that the compression of the spring 29 can be adjusted and therefore the force exerted by the armature 26 on the gear wheel 18 can be adjusted. Between the armature 26 and the core 25 of the coil 24 there is a thin spacing washer 32 of a non-magnetic material having low remanence such as that sold under the trade mark MYLAR; the purpose of this spacing washer will be described in greater detail below.

The core 25 of the coil 24 is screw threaded at 25*a* into the frame 14 and held in position by a lock ring 33. The axial position of the core 25 can be adjusted by screwing it further into or out from the frame 14 to adjust the air gap between the armature 26 and the core 25. When the desired position has been achieved the lock ring is screwed up right and held in position by a grub screw 34 which is screwed through a threaded opening in the lock ring to provide a locking engagement thereof.

The operation of the spool mounting device described above is as follows:

When the solenoid 23 is not energised the spring 29 biases the armature 26, via the bush 27, against the friction lining 17*b* of the gear wheel 18 which is slidably mounted on the shaft 12. Accordingly, the wheel 18 is urged along the shaft 12 until it engages with the fixed hub 16 via the friction lining 17*a*. Since the gear wheel 18 is continuously driven when the motor of the tape recorder is in operation, the shaft 12 will therefore be continuously urged to rotate when the motor is switched on unless the solenoid is energised. In the arrangement described in our copending British Pat. application No. 44088/71 the two tape spools are mounted on similar spool mounting devices, which are preferably devices of the type described herein, and each spool is urged to rotate in opposite directions so that a tension is created in the tape. This tension urges the face of the tape against the magnetic tape head to ensure a good contact therewith.

Thus, in the rest condition, the spindle 12 is urged to rotate but is prevented from so doing by the tension in the tape and therefore, although the frictional engagement of the friction linings 17*a* and 17*b* is at a maximum, the slipping clutch formed by the armature 26 the gear wheel 18 and the hub 16 nevertheless slips so that movement is not, in fact, transmitted to the spindle 12. If the appropriate capstan is also engaged with the tape to release the tension between itself and the spool on the spool mounting device described, then drive is transmitted to the spindle 12 by the slipping clutch since the tension in the tape will be lowered sufficiently for the slipping clutch to operate.

When it is desired to rotate the spool in a direction opposite that to which it is driven by the gear wheel 18, the solenoid 23 is energised so that the armature 26 is attracted towards the core 25 of the coil 24. The friction lining 17*b* is thus disengaged and the gear wheel 18 is allowed to relax its pressure on the hub 16 by an amount determined by the bowed washer 19 in the biasing arrangement comprising the two plain washers 20 and 21 and the bowed washer 19. This arrangement applies a very light pressure between the gear wheel 18 and the hub 16 which allows the spool mounted on the spindle 12 to be rotated substantially freely in either direction, depending on the tension in the tape. If the tension in the tape falls to zero the slight frictional resistance will be sufficient to take up any slack which might otherwise have occurred. When it is desired to again transmit drive to the tape via the spindle 12 from the gear wheel 18, the coil 24 of the solenoid 23 is de-energised. Although there will be some residual magnetism in the core 25 of the coil 24, and also in the armature 26 due to the remanence of the magnetic material, the MYLAR spacer 32 allows the spring 29 to readily break the engagement of these two magnetic members by virtue of the fact that it has itself no remanence. In order to ensure that the solenoid operates very rapidly the coil and the armature can be adjusted by means of the nut 30 and the lock ring 33 as described above.

We claim:

1. A spool mounting device for a tape transport comprising:

A spindle adapted to receive a spool for rotation therewith, frictional drive transmitting means for transmitting drive in either direction of rotation, said drive transmitting means including a first part comprising a wheel slidably mounted and freely rotatable on said spindle, said wheel having a lining of friction material on one face thereof, and a second part fixed to said spindle for rotation therewith, driving means connecting said wheel to a motor for driving said wheel in a selected direction of rotation, resilient biasing means for biasing said wheel into frictional engagement with said second part of said drive transmitting means to transmit drive to said spindle to rotate same in said selected direction of rotation, and means for selectively disengaging said drive transmitting means against the action of the resilient biasing means to allow said spindle to rotate in eithe direction of rotation while said sheel of said drive transmitting means continues to be rotated in said selected direction of rotation.

2. A spool mounting device as claimed in claim 1, in which the resilient biasing means comprises a compression spring surrounding the spindle for biasing the gear wheel into engagement with the said second part of the drive transmitting means.

3. A spool mounting device as claimed in claim 1, in which the means for disengaging the drive transmitting means comprises a solenoid having a coil, a coil core and an armature which is linked to the drive transmitting means.

4. A spool mounting device as claimed in claim 3, in which the solenoid coil and the solenoid armature both surround at least part of the spindle.

5. A spool mounting device as claimed in claim 2, in which the means for disengaging the drive transmitting means comprises a solenoid the armature of which is mounted for rotation with and axially slidable along said spindle, and in which the said compression spring is positioned to bias the armature of the solenoid into engagement with the gear wheel when the solenoid is de-energised.

6. A spool mounting device as claimed in claim 5, in which the gear wheel also has a lining of friction material on the face directed towards the solenoid armature.

7. A spool mounting device as claimed in claim 5, in which there are provided means for adjusting the spring to adjust the biasing force on the solenoid armature.

8. A spool mounting device as claimed in claim 3, in which said coil has a hollow coil core and there are provided means for adjusting the position of the solenoid coil to adjust the air gap between the coil core and the armature.

9. A spool mounting device as claimed in claim 1, in which the spindle has a keyway for locating the members which are mounted for rotation therewith.

10. A spool mounting device as claimed in claim 3, in which there is provided a spacer of a material having a low remanence between the co-operating faces of the coil core and the armature so that the armature is readily released when the coil is de-energised.

11. A spool mounting device as claimed in claim 1, in which the said driving means is arranged to drive the said gear wheel in said selected direction of rotation at all times when the said motor is in operation.

12. A spool mounting device as claimed in claim 1, in which there are provided means for maintaining the gear wheel and the said second part of the drive transmitting means in light frictional engagement when the means for disengaging the drive transmitting means is operated.

13. A tape recording and/or playback machine having a tape transport including at least one tape spool mounting device comprising a spindle adapted to receive a spool for rotation therewith, frictional drive transmitting means for transmitting drive in either direction of rotation, said drive transmitting means including a first part comprising a wheel slidably mounted and freely rotatable on said spindle, said wheel having a lining of friction material on one face thereof, and a second part fixed to said spindle for rotation therewith, driving means connecting said wheel to a motor for driving said wheel in a selected direction of rotation, resilient biasing means for biasing said wheel into frictional engagement with said second part of said drive transmitting means to transmit drive to said spindle to rotate same in said selected direction of rotation, and means for selectively disengaging said drive transmitting means against the action of said resilient biasing means to allow said spindle to rotate in either direction of rotation while said wheel of said drive transmitting means continues to be rotated in said selected direction of rotation.

14. In the tape recording and/or playback machine of claim 13:

a frame element of said tape recording and/or playback machine, a solenoid having a coil, a core and an armature, which is connected to said drive transmitting means, forming said means for disengaging said drive transmitting means, said solenoid coil being screwed into position on said frame element, a locking ring holding said solenoid coil in position on said frame element, adjustments to the position of said coil to adjust the air gap between said core and said armature being effectable by screwing said coil into or out from said frame element when said locking ring is released.

15. A spool mounting device for a tape transport comprising a spindle adapted to receive a spool for rotation therewith, frictional drive transmitting means for transmitting drive in either rotational direction, first resilient biasing means for biasing said drive transmitting means into driving engagement with said spindle to drive the spindle to rotate in a selected direction, means for selectively disengaging said drive transmitting means from said driving engagement to allow said spindle to rotate in either direction, and second resilient biasing means for biasing said drive transmitting means into light frictional engagement with said spindle when said disengaging means is operated to remove said driving engagement, whereby said spindle is subjected to a light braking force when rotated with respect to said drive transmitting means.

16. The spool mounting device of claim 11 wherein said wheel of said drive transmitting means is a pinion gear wheel and said driving means interconnecting said gear wheel and said motor includes at least one further gear wheel meshing with the teeth of said gear wheel.

* * * * *